Jan. 20, 1953
C. E. McCLELLAN
2,626,357
MEANS FOR COMBINING FREQUENCIES
Filed Sept. 19, 1947
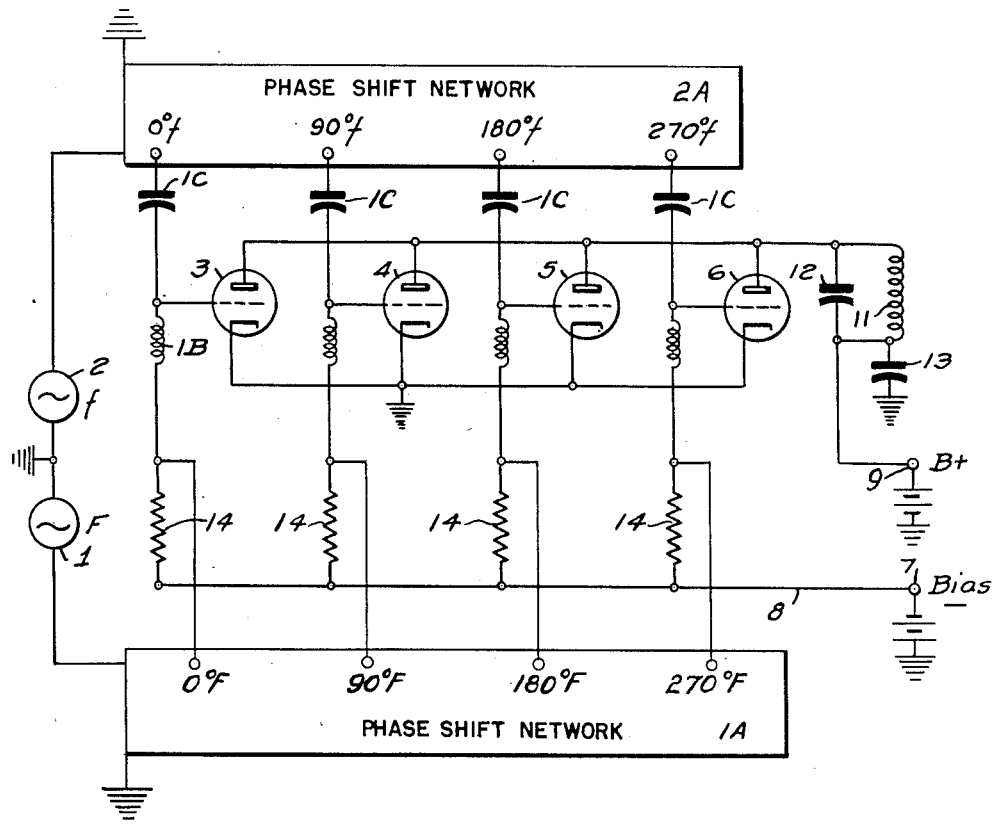
WITNESSES:
INVENTOR
Cyril E. McClellan.
BY
F. W. Lyle.
ATTORNEY Patented Jan. 20, 1953

2,626,357

UNITED STATES PATENT OFFICE 2,626,357

MEANS FOR COMBINING FREQUENCIES

Cyril E. McClellan, Catonsville, Md., assignor to Westinghouse Electric Corporation, East Pittsburgh, Pa., a corporation of Pennsylvania Application September 19, 1947, Serial No. 775,122

14 Claims. (Cl. 250—36)

My invention relates to means for combining alternating-current voltages of different frequencies, and, in particular, relates to an arrangement for obtaining an output voltage or current having a frequency equal to the sum or difference of the two frequencies combined, and in which all frequencies except the sum or difference frequency, as the case may be, which is being derived, shall be substantially suppressed. Such an arrangement is particularly useful where it is desired to produce an output current or radio wave which is switched abruptly from one frequency to another, for example, in telegraph transmission systems employing frequency modulation. It is also useful in situations where it is desired to combine two frequencies effectively without having to employ complicated filters and similar devices for rejecting either of the component frequencies or the image frequency of that frequency which is being derived, which is effectively the generation of a single side-band.

One object of my invention is, accordingly, to provide an arrangement in which two alternating voltages of different frequency may be impressed, and an alternating voltage derived which has a frequency which is the difference between the frequencies of the impressed voltages.

Another object of my invention is to provide an arrangement in which a carrier voltage may be amplitude modulated with a voltage of substantially lower frequency, and both the carrier voltage and the image frequency voltage be suppressed in the output circuit.

Still another object of my invention is to provide an arrangement in which an alternating voltage having a frequency equal to the sum or difference of the frequencies of two impressed voltages may be obtained without the use of complicated and expensive filtering circuits.

Other objects of my invention will become apparent upon reading the following description, taken in connection with the drawing, in which the single figure is a schematic diagram showing one circuit for embodying the principles of my invention.

Referring in detail to the drawing, I provide a source of alternating voltage 1 having a frequency F which is equipped for deriving through a phase shift network 1A four preferably equal voltages which, respectively, have the phases zero, 90 degrees, 180 degrees and 270 degrees. I also provide a second alternating-voltage source 2 which has a higher frequency $f$ and which is likewise arranged to provide through a phase shift network 2A four preferably equal voltages having phases zero, 90 degrees, 180 degrees and 270 degrees. The system here shown is particularly useful where the frequency F is small relative to frequency $f$. The voltages of the two sources 1 and 2 are preferably equal to each other. I likewise provide four grid-controlled electron discharge tubes 3, 4, 5 and 6 which may be of any suitable conventional type and which have their anodes and cathodes connected in multiple with each other. Between the control grid of the tube 3 and its cathode, I impress the zero phase voltages of the alternators 1 and 2 in serial relation. This may be done, for example, by impressing the output voltage of alternator 1 across resistor 14, and by impressing the output of alternator 2 across capacitor 1C and inductor 1B, the control grid of tube 3 being connected to the junction of 1B and 1C. Between the control grid and cathode of tube 4, I impress in serial relation the voltages of the alternators 1 and 2 which have the 90-degree phase relation relative to the voltages impressed on tube 3. Similarly, on tubes 5 and 6 I impress between the control grids and cathodes in series relation the output voltages of the alternators 1 and 2, which have, respectively, the 180-degree phase relation and the 270-degree phase relation to the voltages impressed on tube 3.

While I have stated that the output voltages of the alternators 1 and 2 are impressed between the control grids and cathodes of the tubes 3, 4, 5 and 6, it will be understood that this connection may include a bias voltage source 7, having a negative terminal connected to the lead 8 and having its positive terminal connected to the cathodes of all the tubes 3, 4, 5 and 6 through ground. The common anode lead of the tubes 3, 4, 5 and 6 is connected to the positive terminal 9 of a direct-current voltage source having its negative terminal connected to the common cathodes of said tubes through a tuned resonant circuit comprising an inductor 11 and a capacitor 12. The terminal of the inductor 11 which is adjacent the positive terminal 9 is preferably connected to the common cathode of the tubes 3, 4, 5 and 6, for example, through ground, by a bypass capacitor 13.

The value of bias 7 is so adjusted that if the voltage of the alternator 1 is zero, the tubes 3, 4, 5 and 6 are just at the cut-off condition. Under these circumstances, each of the tubes 3, 4, 5 and 6 will be rendered conductive during those half periods of alternator 1 in which it impresses a positive potential on the grid of that particular tube. A brief consideration will show that, since the grid voltages thus impressed are displaced in phase from each other by a quarter period of alternator 1, there will always be two tubes on which alternator 1 impresses a grid potential at any one time; i. e., during one-quarter cycle of alternator 1, tubes 3 and 4 have positive grid potentials and so are conductive, during another quarter-cycle tubes 4 and 5 are conductive, and so on.

Thus, if we consider the quarter-cycle in which tubes 3 and 4 are conductive, we may represent the grid potential of tube 3 by the quantity $A \sin 2\pi Ft \sin 2\pi ft$, and if the output current is proportional to the grid voltage, the alternating current drawn by tube 3 from source 9 may be written $$I_3 = B \sin 2\pi Ft \sin 2\pi ft \qquad (1)$$

Similarly, if the voltages impressed by both alternators 1 and 2 lead the voltages they respectively impress on tube 3 by 90 degrees, the current drawn by tube 4 may be written $$I_4 = B \cos 2\pi Ft \cos 2\pi ft \qquad (2)$$

The total current drawn from the source 9 during that quarter period in which tubes 3 and 4 are conductive is the sum of these two quantities and may be written $$I = B (\sin 2\pi Ft \sin 2\pi ft + \cos 2\pi Ft \cos 2\pi ft) \qquad (3)$$

By a well known theorem of trigonometry, the quantity in the parenthesis is $\cos 2\pi(f-F)t$; in short, the current flowing from the source 9 is a sinusoidal current having a frequency equal to the difference between the frequencies of alternator 1 and alternator 2. Exactly similar calculations for the other tubes of the group during the quarter cycles in which their respective pairs are conductive can easily be shown to lead to the same formula for the frequency of the current drawn from source 9.

A current having a frequency equal to the difference-frequency will, accordingly, flow from the positive terminal 9 through the resonant circuit 11, 12. This circuit is preferably tuned to the difference-frequency. Any desired load circuit may be coupled to the resonant circuit 11, 12.

While I have shown the four different phases of the alternators 1 and 2 as connected to control grids in four separate electron tubes 3, 4, 5 and 6, there are circuit modifications which will be evident to those skilled in the art which will differ from this arrangement. For example, the outputs of the alternators 1 and 2, instead of being serially connected to a suitable control grid, may be impressed separately on two different control grids in the same tube. Furthermore, while the tubes 5 and 6 have their control grids impressed with voltages which are, respectively, 180 degrees out of phase from the voltages impressed on the tubes 3 and 4, their control grids may be impressed with voltages $f$ which are, respectively, cophasal with those impressed on tubes 3 and 4, and their anode circuits be connected to the resonant circuit 11, 12 through a separate channel from that connected to tubes 3 and 4, this channel being provided with suitable transformer windings to supply to the anti-resonant circuit 11, 12 a voltage which is 180 degrees out of phase with that supplied to that circuit by the tubes 3 and 4.

In the foregoing, I have described a situation where the phase of the voltage applied by both alternator 2 and alternator 1 to tube 4 was 90 degrees in advance of the voltages applied by those alternators to tube 3, and this results in drawing a current from source 9 having a frequency equal to the difference of the frequencies of alternators 1 and 2. If now the polarity of the voltage applied by either one of the alternators to tubes 4 and 6 is changed through 180 degrees, the positive sign between the two terms of Equation 3 above changes to negative since the cosine of an angle is well known to be the negative of the cosine of an angle which is 180 degrees different. The expression for the total current, therefore, becomes $$I = B (\sin 2\pi Ft \sin 2\pi ft - \cos 2\pi Ft \cos 2\pi ft) \qquad (4)$$

and the term in parenthesis is equal to $\cos 2\pi(f+F)t$. In short, the frequency of the current flowing from source 9 through winding 11 is the sum of the frequencies $F$ and $f$. At such times the timing of tank circuit 11, 12 is preferably changed also to $f+F$.

It is thus possible by providing a switching arrangement which reverses the connections to the alternator 1 of the resistors 14 on tubes 4 and 6 to shift the output frequency from $f-F$ to $f+F$ at will. The resulting arrangement would be particularly applicable to frequency modulated radio telegraph systems in which the dots and dashes had, say, a frequency $f+F$ and the spaces between the dots and dashes had the frequency $f-F$.

The invention may be reviewed briefly as follows. The four tubes 3, 4, 5 and 6 may be referred to as operating devices or mixers. Each of the tubes has impressed thereon a control effect equal to the instantaneous sum of two voltages derived from two sources 1 and 2. For example, between the grid and cathode of the tube 3 an excitation voltage is applied which is a sum of the voltages appearing across the inductor 1B and the resistor 14. Each of the remaining tubes has impressed thereon a control effect which is similar to that applied to the tube 3 except for the phase displacements of the control effects which are indicated on the drawing.

While I have shown the voltage F as a sine wave type with the result that I vary the frequency of the output voltage as above described, the system may be used as a phase-shift or phase modulating device by substituting for alternator 1 a direct current source which can be varied in finite steps to produce a phase modulation in correspondence with an impressed signal. The substitution of a voice-current for the alternator 1 will voice-modulate the output voltage derived from winding 11 and will produce a single sideband current free from distortion throughout the frequency range in which accurate 90 degree phase displacement is maintained between the voltages impressed from the source 1 on the respective tubes 3, 4, 5 and 6.

I claim as my invention:

1. In combination with two alternating-current voltage sources of different frequency, each provided with means for deriving a first voltage and also a second voltage which is 90 degrees out of phase with said first voltage, means for impressing on the current path of a first electrical discharge tube a control effect which is proportional in instantaneous value to the sum of the first voltages of said two sources, means for impressing on the current path of a second electrical discharge tube a control effect which is proportional in instantaneous value to the sum of the second voltages of said two voltage sources, and means for impressing on a load circuit a voltage which is proportional in instantaneous value to the sum of the outputs of said first and second electrical discharge tubes.

2. In combination with two alternating-current voltage sources of different frequency, each provided with means for deriving a first voltage and also a second voltage which is 90 degrees out of phase with said first voltage, means for impressing on the current path of a first electrical discharge tube a control effect which is proportional in instantaneous value to the sum of the first voltages of said two sources, means for impressing on the current path of a second electrical discharge tube a control effect which is proportional in instantaneous value to the sum of the second voltages of said two voltage sources, means for impressing on the current path of a third electrical discharge tube a control effect which is proportional in instantaneous value to, but 180 degrees out of phase with, the sum of said first voltages of said two sources, means for impressing on the discharge path of a fourth electrical discharge tube a control effect which is proportional to, but 180 degrees out of phase with, the sum of said second voltages of said two sources, and means for energizing a load in accordance with the sum of the output currents of said electrical discharge tubes.

3. In combination with two alternating-current voltage sources of different frequency, each provided with means for deriving a first voltage and also a second voltage which is 90 degrees out of phase with said first voltage, means for impressing on the current path of a first electrical discharge tube a control effect which is proportional in instantaneous value to the sum of the first voltages of said two sources, means for impressing on the current path of a second electrical discharge tube a control effect which is proportional in instantaneous value to the sum of the second voltages of said two voltage sources, means for impressing on the current path of a third electrical discharge tube a control effect which is proportional in instantaneous value to, but 180 degrees out of phase with, the sum of said first voltages of said two sources, means for impressing on the discharge path of a fourth electrical discharge tube a control effect which is proportional to, but 180 degrees out of phase with, the instantaneous sum of said second voltages of said two sources, and means for energizing a load through an anti-resonant circuit tuned to the difference-frequency of said two sources in accordance with the sum of the output currents of said electrical discharge tubes.

4. In combination with two alternating-current voltage sources of different frequency, each provided with means for deriving a first voltage and also a second voltage which is 90 degrees out of phase with said first voltage, means for impressing on the current path of a first electrical discharge tube a control effect which is proportional in instantaneous value to the sum of the first voltages of said two sources, means for impressing on the current path of a second electrical discharge tube a control effect which is proportional in instantaneous value to the sum of the second voltages of said two voltage sources, and means for impressing on a load circuit through a resonant circuit a voltage which is proportional to the sum of the outputs of said first and second electrical discharge tubes.

5. In combination with two alternating-voltage sources of different frequency, each provided with means for deriving a pair of voltages which are 90 degrees out of phase with each other, four electrical discharge tubes having their anodes and cathodes connected in multiple with each other to be supplied with energy from a direct-current source, means for impressing on the first of said four electrical discharge tubes a control effect proportional to the instantaneous sum of one voltage from each of said pairs, means for impressing on the second of said discharge tubes a control effect equal to the instantaneous sum of the other voltage from each of said pairs, means for impressing on said third electrical discharge tube a voltage which is 180 degrees out of phase with the voltage impressed on said first electrical discharge tube, and means for impressing on the fourth of said discharge tubes a control effect which is 180 degrees out of phase with the control effect impressed on the second of said electrical discharge tubes.

6. In combination with two alternating-voltage sources of different frequency, each provided with means for deriving a pair of voltages which are 90 degrees out of phase with each other, four electrical discharge tubes having their anodes and cathodes connected in multiple with each other and then to a direct current source through a circuit tuned to the difference-frequency of said sources, means for impressing on the first of said four electrical discharge tubes a control effect proportional to the instantaneous sum of one voltage from each of said pairs, means for impressing on the second of said discharge tubes a control effect equal to the instantaneous sum of the other voltage from each of said pairs, means for impressing on said third electrical discharge tube a voltage which is 180 degrees out of phase with the voltage impressed on said first electrical discharge tube, and means for impressing on the fourth of said discharge tubes a control effect which is 180 degrees out of phase with the control effect impressed on the second of said electrical discharge tubes.

7. In combination with four grid-controlled electrical discharge tubes having their anodes and cathodes connected in multiple with each other to be supplied with current from a direct-current voltage source, an anti-resonant circuit serially connected between said direct-current voltage source and said tubes, a bias source having one terminal connected to said cathodes and its other terminal to said cathodes, a pair of alternating-voltage sources of different frequency, each arranged to supply voltages of four different phases in quadrature with each other, and means for impressing on the respective control grids of said four electrical discharge tubes control voltages which are proportional, respectively, to the instantaneous sums of the four phase-voltages of said voltage sources.

8. In a device for modifying the frequencies of alternating quantities, a first polyphase source of a first alternating quantity, said source providing first phase components which are displaced in phase from each other, a second polyphase source of a second alternating quantity, said second source providing second phase components which are displaced in phase from each other by phase displacements substantially equal to the phase displacements between the phase components of the first source, said first and second phase components being equal in number, a plurality of mixers equal in number to said first phase components, connections for applying to each of the mixers a separate one of the phase components from each of the sources, the two-phase components applied to each of the mixers being corresponding phase components from the two sources, and connections combining the outputs of the mixers to reject substantially the frequencies of said sources and to provide a single phase output having a frequency representative of a function of the frequencies of said two sources.

9. A device as claimed in claim 8 wherein each of said polyphase sources comprises a four-phase source having phase components displaced by substantially 90 degrees, in combination with a load connected for energization by the outputs of said mixers in parallel.

10. A device as claimed in claim 8 wherein each of said mixers comprises an electronic device having a cathode electrode, an anode electrode and control means for controlling current passing between the cathode electrode and the anode electrode, said connections applying between the control means and one of the electrodes for each mixer an excitation proportional to the combined two phase components applied to the mixer.

11. A device as claimed in claim 10 in combination with biasing means for biasing the mixers.

12. A device as claimed in claim 10 in combination with a load connected for energization in accordance with the sum of the currents passing between said electrodes.

13. In a device for modifying the frequencies of alternating quantities, a first polyphase source of a first alternating quantity, said source providing first phase components which are displaced in phase from each other, a second polyphase source of a second alternating quantity, said second source providing second phase components which are displaced in phase from each other by phase displacements substantially equal to the phase displacements between the phase components of the first source, said first and second phase components being equal in number, a plurality of operating devices equal in number to said first phase components, each of the operating devices being capable of producing an output comprising a quantity representative of the product of two inputs to the operating device, connections for applying to each of the mixers a separate one of the phase components from each of the sources, the two phase components applied to each of the operating devices being corresponding phase components from the two sources, and connections combining the outputs of the mixers to reject substantially the frequencies of said sources and to provide a single phase output having a frequency representative of a function of the frequencies of said two sources.

14. A device as claimed in claim 13 wherein each of the operating devices comprises an electric discharge device having a pair of main electrodes which normally carry the discharge current and control means for controlling the current passing between the main electrodes, said connections applying to the control means for each of the operating devices, an excitation proportional to the combined two phase components applied to the operating device, and output means responsive to the currents passing between the main electrodes of the operating devices in parallel.

CYRIL E. McCLELLAN.

REFERENCES CITED

The following references are of record in the file of this patent:

UNITED STATES PATENTS

| Number | Name | Date |
| --- | --- | --- |
| 2,178,432 | Peterson | Oct. 31, 1939 |